United States Patent [19]

Nishide

[11] Patent Number: 5,056,146
[45] Date of Patent: Oct. 8, 1991

[54] THREE-DIMENSIONAL LABELING APPARATUS FOR TWO-DIMENSIONAL SLICE IMAGE INFORMATION

[75] Inventor: Akihiko Nishide, Tokyo, Japan

[73] Assignee: Kabushiki Kaisha Toshiba, Kawasaki, Japan

[21] Appl. No.: 250,152

[22] Filed: Sep. 28, 1988

[30] Foreign Application Priority Data

Sep. 29, 1987 [JP] Japan .................. 62-245432

[51] Int. Cl.$^5$ .............................................. G06K 9/00
[52] U.S. Cl. ................................. 382/6; 382/50; 382/52
[58] Field of Search ............... 382/50, 51, 6, 54, 52, 382/18, 61; 364/413.23, 413.13, 413.14, 413.16; 250/363.02, 363.04

[56] References Cited

U.S. PATENT DOCUMENTS

| | | | |
|---|---|---|---|
| 4,149,081 | 4/1979 | Seppi | 382/6 |
| 4,189,775 | 2/1980 | Inouye et al. | 382/6 |
| 4,293,912 | 10/1981 | Walters | 364/414 |
| 4,339,799 | 7/1982 | Abele et al. | 364/414 |
| 4,495,645 | 1/1985 | Ohhashi | 382/6 |
| 4,516,261 | 5/1985 | Harding et al. | 382/6 |
| 4,707,786 | 11/1987 | Dehne | 382/6 |
| 4,736,307 | 4/1988 | Salb | 364/518 |
| 4,751,643 | 6/1988 | Lorensen et al. | 382/6 |
| 4,868,747 | 9/1989 | Mori et al. | 382/6 |
| 4,922,915 | 5/1990 | Arnold et al. | 382/6 |

Primary Examiner—Michael Razavi
Attorney, Agent, or Firm—Oblon, Spivak, McClelland, Maier & Neustadt

[57] ABSTRACT

Two-dimensional tomographic image data is binarized by a predetermined threshold value, and two-dimensional labeling numbers are sequentially given to areas formed by binarization. Data of adjacent tomographic images are bit-added to generate data of a double bit length. When a value of this doubled-bit data appears at a frequency over a predetermined value, it is determined that corresponding areas of the adjacent tomographic image data are connected three-dimensionally, and a three-dimensional labeling number is given.

6 Claims, 9 Drawing Sheets

THREE-DIMENSIONAL LABELING APPARATUS FOR TWO-DIMENSIONAL SLICE IMAGE INFORMATION

BACKGROUND OF THE INVENTION

1. Field of the Invention

The present invention relates to an image information processing apparatus having a three-dimensional labeling apparatus for labeling image data of an object such as a material and a product having specific areas therein so as to effectively determine a characteristic or a defect state, and, more particularly, to an image information processing apparatus which can perform three-dimensional labeling processing using a two-dimensional image processing function.

2. Description of the Related Art

In general, a tomographic image forming apparatus such as an X-ray CT scanner, an NMR-CT scanner utilizing a nuclear magnetic resonance phenomenon (NMR), or an ultrasonic tomographic apparatus can intermittently form a plurality of tomographic images of a human body or an industrial product in a direction perpendicular to a slice direction. In order to extract image information of a specific three-dimensional area from the tomographic images (slice images), specific areas of a plurality of adjacent two-dimensional tomographic images must be sequentially connected with each other to be used as a three-dimensional image.

In order to perform the above three-dimensional image processing in a conventional manner, binary images are compared with each other in units of two adjacent pixels in a tomographic image using a general computer, and binary pixels belonging to a specific area are connected. Then, the next adjacent tomographic image which is intermittently obtained is subjected to the same processing to find a specific area on the tomographic image. Binary images of pixels at the same position of the adjacent tomographic images are compared to check whether they belong to the specific area. This processing is repeatedly performed to extract the specific area in a three-dimensional direction. In this manner, the conventional three-dimensional image processing must be performed using the general computer for a long time period.

In the above conventional three-dimensional processing, adjacent pixels are sequentially compared on each tomographic image and between adjacent tomographic images, thereby finding connection of a specific area. Therefore, the processing cannot be performed at high speed, and other processing is adversely affected. In addition, it is difficult to make the entire system compact because a general computer is used, and therefore the system becomes expensive.

SUMMARY OF THE INVENTION

The present invention has been made in consideration of the above situation and has as its object to provide an image information processing apparatus including a three-dimensional labeling apparatus which can obtain connection between specific areas on each tomographic image and between tomographic images by labeling processing at high speed and low cost.

A three-dimensional labeling apparatus used in an image information processing apparatus according to the present invention comprises: a two-dimensional image memory means for storing a plurality of tomographic images formed by a tomographic image forming unit and aligned three-dimensionally; a two-dimensional labeling means for performing two-dimensional labeling in which each tomographic image stored in the two-dimensional image memory means is binarized by a predetermined threshold value and divided into areas; a two-dimensional histogram forming means for forming a two-dimensional histogram for gradation in a plurality of tomographic images subjected to labeling of the two-dimensional labeling means; and a three-dimensional connection information table forming means for forming a three-dimensional connection information table in accordance with two-dimensional label information of the tomographic images and label connection information of the tomographic images obtained in accordance with histogram information obtained by the two-dimensional histogram forming means.

Therefore, according to the information processing apparatus of the present invention comprising the above means, tomographic images formed by the tomographic image forming unit are binarized by a predetermined threshold value and divided into areas. Thereafter, gradation in a plurality of tomographic images subjected to labeling by the two-dimensional labeling means is obtained by the two-dimensional histogram forming means to form a two-dimensional histogram, thereby acquiring label connection information for between adjacent tomographic images the areas on the tomographic images subjected to two-dimensional labeling. Then, a three-dimensional connection information table is formed by the three-dimensional connection information table forming means in accordance with the two-dimensional label information of the tomographic images divided into areas formed by the two-dimensional labeling means and the label connection information of the tomographic images formed by the two-dimensional histogram forming means. Three-dimensional labeling is performed in accordance with the three-dimensional connection information table.

DETAILED DESCRIPTION OF THE PREFERRED EMBODIMENT

Figure 1:
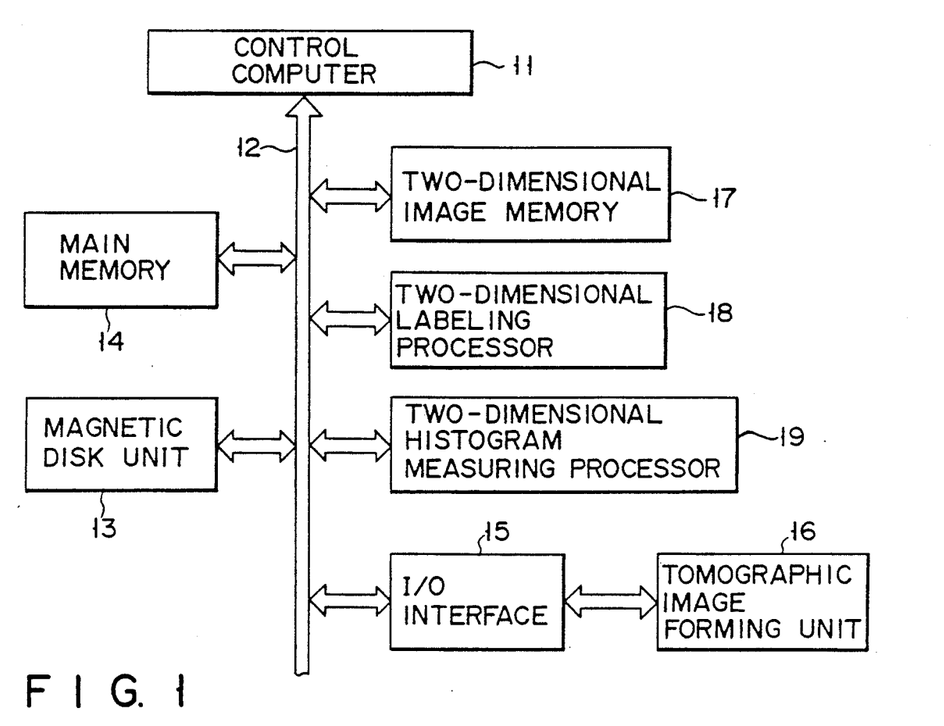
FIG. 1 is a block diagram showing an arrangement of an embodiment of an image information processing apparatus according to the present invention.

An embodiment of the present invention will be described in detail below with reference to the accompanying drawings. First, referring to FIGS. 1 and 2, an arrangement and a function of the entire system according to the embodiment will be described. In FIG. 1, control computer 1 for controlling an operation of the entire system is connected to bus line 12, having a multiarrangement, for transmitting an address signal, data, control signal and the like. To line 12 is connected magnetic disk unit 13 and main memory unit 14. Magnetic disk unit 13 stores programs for constituting an operating system of computer 11 and other application programs and also stores a continuous tomographic image as a three-dimensional image if necessary. Main memory unit 14 stores necessary information in accordance with address designation of computer 11.

Figure 2:
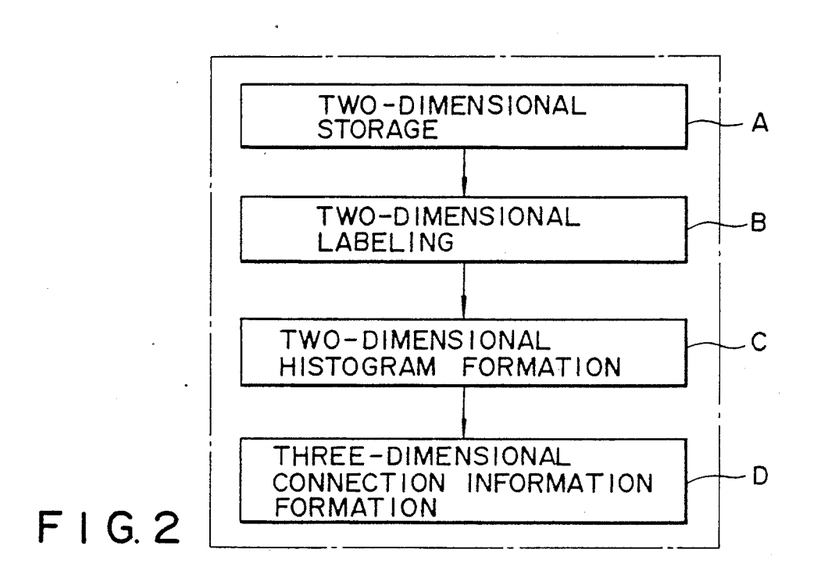
FIG. 2 is a view showing an operation of performing three-dimensional labeling of the present invention as functional blocks.

To line 12 is also connected tomographic image forming unit 16 such as an X-ray CT scanner through I/O interface 15. Unit 16 forms a plurality of intermittent tomographic images (slice images) of an object to be examined in an arbitrary direction and outputs the images to line 12 through interface 15. In addition to the X-ray CT scanner, various apparatuses having a similar function such as an NMR-CT and an ultrasonic tomographic apparatus may be used as unit 16. Reference numeral 17 denotes a two-dimensional image memory which includes tomographic image forming unit 16 and constitutes a two-dimensional image memory means. When computer 11 executes a program, memory 17 sequentially and two-dimensionally stores intermittent tomographic images from tomographic image forming unit 16 in accordance with a predetermined order, as indicated by A in FIG. 2. Reference numeral 18 denotes a two-dimensional labeling processor comprising, e.g., a microcomputer, which includes a labeling function of computer 11 and constitutes a two-dimensional labeling means. That is, processor 18 performs labeling processing in which a gradation image of a two-dimensional tomographic image stored in memory 17 is binarized by a predetermined threshold value and divided into areas, as indicated by B in FIG. 2. Alternatively, processor 18 performs labeling of a binary image of a two-dimensional tomographic image at four points on an (x,y) coordinate plane. Reference numeral 19 denotes a two-dimensional histogram measuring processor comprising, e.g., a microcomputer similar to that of processor 18, which includes histogram processing of computer 11 and constitutes a two-dimensional histogram measuring means. Processor 19 assigns upper eight bits and lower eight bits to gray level values (e.g., 8 bits for 256 gray levels) of pixels at the same coordinate point of two tomographic images stored in memory 17, respectively, and superposes the pixels to form a 16-bit two-dimensional gradation histogram, as indicated by C in FIG. 2. Note that three-dimensional connection information table formation indicated by D in FIG. 2 is mainly performed by program processing of computer 11. A three-dimensional connection information table formed by this processing is written in main memory 14 or other necessary memories.

An operation of the embodiment of the present invention will be described below with reference to a flow chart shown in FIG. 3. Computer 11 executes two-dimensional image storage processing in accordance with a program stored in magnetic disk unit 13. That is, as shown in step S1, in this two-dimensional image storage processing, 256 gray levels of 256×256 pixels are given to 32 continuous tomographic images formed by tomographic image forming unit 16 such as an X-ray CT scanner, and the 32 tomographic images are input to bus line 12 having a multiarrangement through interface 15. Computer 11 reads and sequentially stores the tomographic images in two-dimensional image memory 17 in a predetermined order.

Figure 4A:
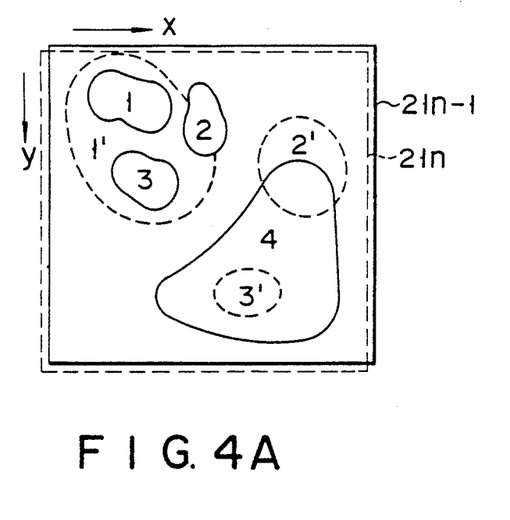
FIGS. 4A and 4B are views for explaining two-dimensional labeling of two adjacent tomographic images.

In this manner, after the 32 tomographic images are stored in memory 17, two-dimensional labeling processor 18 receives a command based on the program from computer 11 and executes two-dimensional labeling processing. In this two-dimensional labeling, the tomographic images are sequentially read out from memory 17 and binarized using the same threshold value, thereby forming binary images. Thereafter, isolated point removal and edge smoothing processing of the binary image of each tomographic image are performed using a two-dimensional logic filter. Then, two-dimensional labeling at four points on the (x,y) coordinate plane is performed for each pixel of the binarized tomographic image, thereby numbering each area of the tomographic image. In FIG. 4A, numbers are given to areas in nth binarized tomographic image $21n$ (dashed line) and $(n-1)$th binarized tomographic image $21n-1$ (solid line). As is apparent from FIG. 4A, four areas 1 to 4 (1 to 4 are area numbers) each of which is a group of pixels of, e.g., a binary image of "1" are present in the nth tomographic image, and three areas 1' to 3' (1' to −3' are area numbers) are similarly present in the $(n-1)$th tomographic image.

Figure 4B:
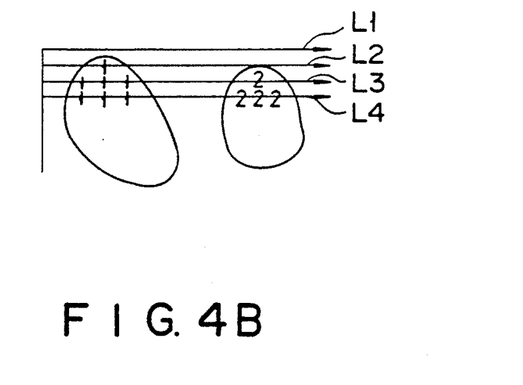

In this case, a numbering order of the areas corresponds to an order of the areas detected when x-direction scanning lines are moved in the y direction, in FIG. 4B. In FIG. 4B, scanning line L2 first detects area 1 and labeled as "1". Scanning line L3 first detects area 1 and then detects area 2 and label "2" is assigned thereto. Each time area 1 is detected by respective scanning lines L3, L4 . . . area 1 is labeled as "1" and each time area 2 is detected by scanning lines L3, L4, . . . area 2 is labeled as "2". Therefore, in FIG. 4A, upper left area "1" is detected earliest, and lower right area "4" is detected last. As a result of the two-dimensional labeling as shown in FIG. 4A, it can be assumed that areas "1", "2", and "3" of tomographic image $21n$ are connected to area "1'" of tomographic image $21n-1$ and area "4" of the former is connected to areas "2'" and "3'" of the latter. The two-dimensional label data obtained as described above is stored in memory 17 in association with the corresponding two-dimensional tomographic images.

Figure 5:
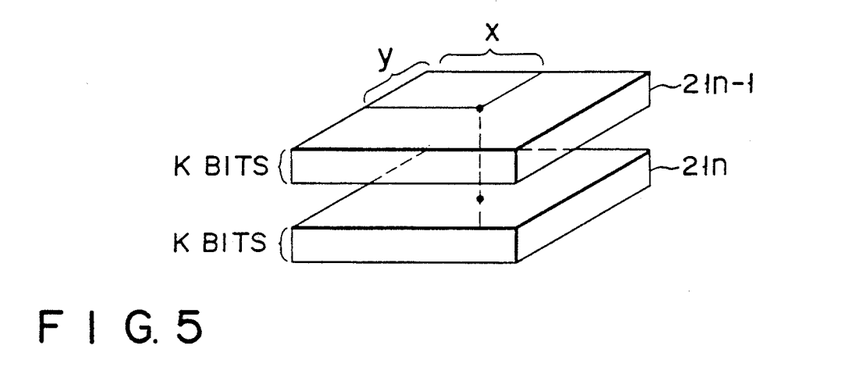
FIGS. 5 to 7 are views for explaining a method of forming a two-dimensional histogram of the two adjacent tomographic images subjected to two-dimensional labeling.
Figure 6:
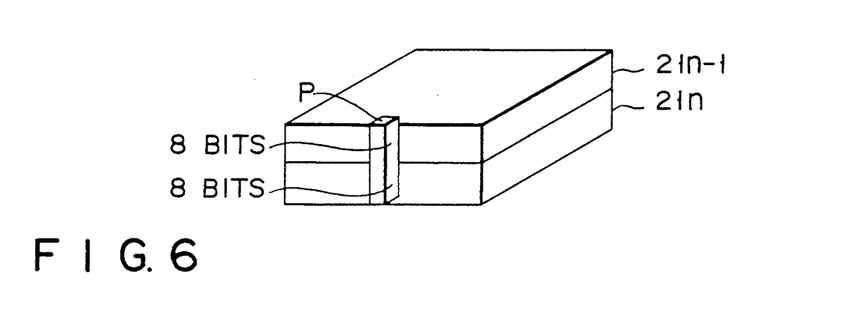
Figure 7:
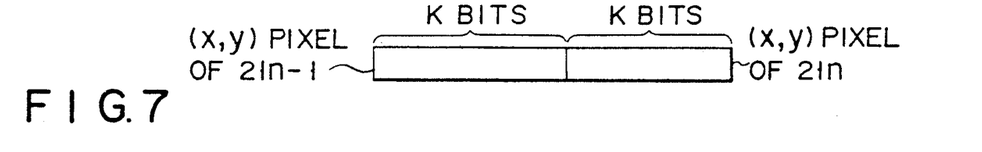

After numbers are given to the areas by two-dimensional labeling, in order to obtain a connection relationship between the areas of a plurality of successive tomographic images, two-dimensional histogram measuring processor 19 executes a two-dimensional histogram formation program in accordance with a program command from computer 11 as shown in step S3. In this two-dimensional histogram formation, two adjacent tomographic images, e.g., nth and $(n-1)$th tomographic images are read out and superposed so that pixel positions of the tomographic images coincide with each other as shown in FIG. 5, and a two-dimensional density histogram for the upper (n−1)th tomographic image and the lower nth tomographic image is obtained. In this case, the histogram is formed by plotting densities of the pixels on the abscissa and appearance frequencies of the densities on the ordinate. Note that in FIG. 5, the gradation of each pixel of the tomographic image has k bits. For example, when the gradation has a depth of eight bits, a pixel value of the (n−1)th tomographic image is assigned to upper eight bits, and that of the nth tomographic image is assigned to lower eight bits, as shown in FIG. 6. Then, as shown in FIG. 7, the two tomographic images are superposed to form 16-bit two-dimensional gradation histogram data. In FIG. 6, reference symbol P represents one pixel. As a result of this two-dimensional gradation histogram formation, a pixel position at which a density value has a maximum frequency is detected. That is, by extracting values of upper eight bits and lower eight bits of the 16-bit density value of the pixel having the maximum frequency, label numbers of areas connected with each other between a tomographic image to which the upper eight bits belong and a tomographic image to which the lower eight bits belong are found. In this manner, connection between the tomographic images is determined (step S4). This will be described in more detail using four adjacent tomographic images shown in FIG. 8A. Tomographic image "1" has five areas which are groups of pixels of binary images of "1" and are assigned with area numbers, i.e., two-dimensional label numbers 1 to 5 which are noted in this order mentioned in FIG. 4B. Similarly, tomographic image "2" has three areas assigned with two-dimensional label numbers 1 to 3, tomographic image "3" has six areas assigned with two-dimensional label numbers 1 to 6, and tomographic image "4" has four areas assigned with two-dimensional label numbers 1 to 4. As for a vertical relationship between tomographic images "1" to "4", they are on the same pixel position. Therefore, as is apparent from an area relationship between tomographic images "1" to "4", areas 1 and 3 of tomographic image "1" are connected to area 1 of tomographic image "2", area 4 of tomographic image "1" is connected to area 1 of tomographic image "2" through an overlapped portion of area 1 of tomographic image "2" and area 3 of tomographic image "3". Areas 2 and 5 of tomographic image "1" are connected with each other through area 2 of tomographic image "2" and therefore are represented as area 2. These connections are label connection information of the tomographic images and are defined as three-dimensional label numbers.

Figure 8A:
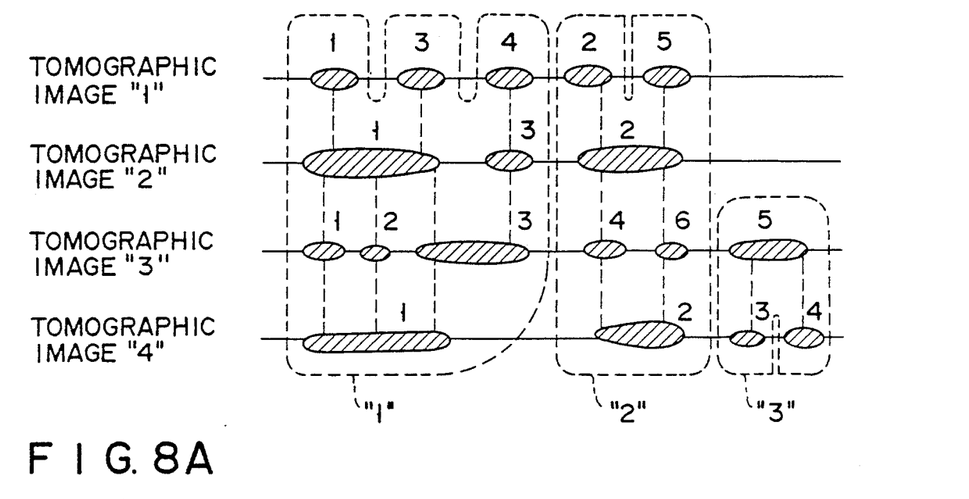
FIGS. 8A and 8B are views showing how specific areas of the tomographic images are connected with each other in a direction perpendicular to a slicing plane of the tomographic images.

After the two-dimensional and three-dimensional label numbers of tomographic images "1" to "4" shown in FIG. 8A are obtained, computer 11 forms a three-dimensional connection information table as shown in Table 1 (step S5).

TABLE 1

| Tomographic Image No. | Two-Dimensional Label No. | Three-Dimensional Label No. |
| --- | --- | --- |
| 1 | 1 | 1 → 1 |
| 1 | 2 | 3 → 3 |
| 1 | 3 | 1 → 1 |
| 1 | 4 | 2 → 1 |
| 1 | 5 | 3 → 2 |
| 2 | 1 | 1 → 1 |
| 2 | 2 | 3 → 2 |

TABLE 1-continued

| Tomographic Image No. | Two-Dimensional Label No. | Three-Dimensional Label No. |
| --- | --- | --- |
| 2 | 3 | 2 → 1 |
| 3 | 1 | 1 |
| 3 | 2 | 1 |
| 3 | 3 | 1 |
| 3 | 4 | 2 |
| 3 | 5 | 3 |
| 3 | 6 | 2 |
| 4 | 1 | 1 |
| 4 | 2 | 2 |
| 4 | 3 | 3 |
| 4 | 4 | 3 |

Three-dimensional labeling is performed in accordance with the three-dimensional connection information table in Table 1 obtained as described above.

Figure 9:
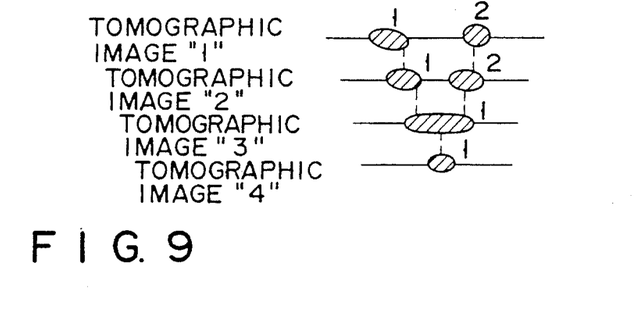
FIGS. 9 to 11 are views showing a method of performing labeling processing for a result of two-dimensional labeling shown in FIGS. 8A and 8B.
Figure 10:
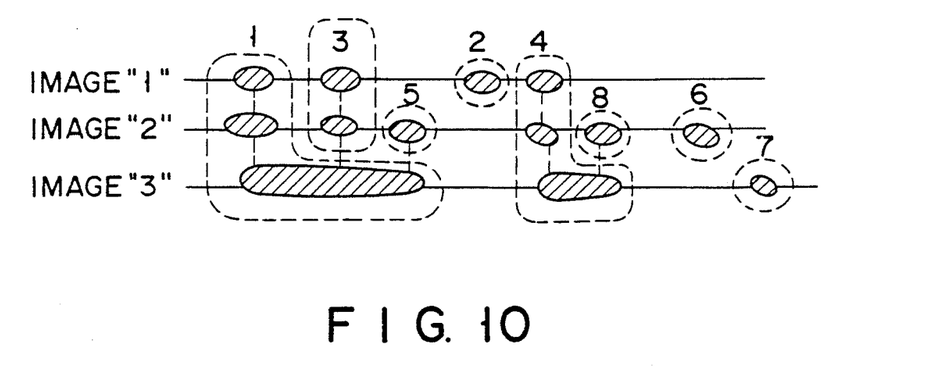
Figure 11:
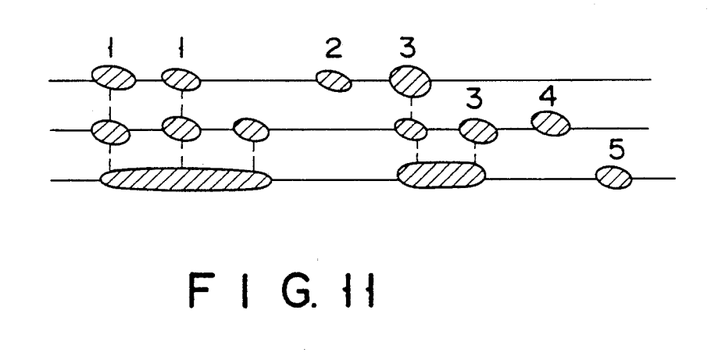

In step S6, processing in steps S3, S4, and S5 is performed for second and third tomographic images. Subsequently, the flow returns to step S3 to perform the processing for the next tomographic image, thereby performing three-dimensional labeling for all of the 32 tomographic images. Note that as shown in FIG. 9, first tomographic images "1" and "2" are not directly three-dimensionally connected with each other but are three-dimensionally connected through tomographic images "3" and "4". Therefore, in this case, a three-dimensional label must be relabeled. That is, in order to perform three-dimensional labeling when the tomographic images have areas as shown in FIG. 10, a relabeling table shown in Table 2 is formed as shown in step S6, and label numbers are reassigned in accordance with the relabeling table as shown in FIG. 11 (step S7). Note that in Table 2, eight old three-dimensional label numbers are present.

TABLE 2

| Old Three-Dimensional No. | New Three-Dimensional No. |
| --- | --- |
| 1 | 1 |
| 2 | 2 |
| 3 | 1 |
| 4 | 3 |
| 5 | 1 |
| 6 | 4 |
| 7 | 5 |
| 8 | 3 |

Figure 3:
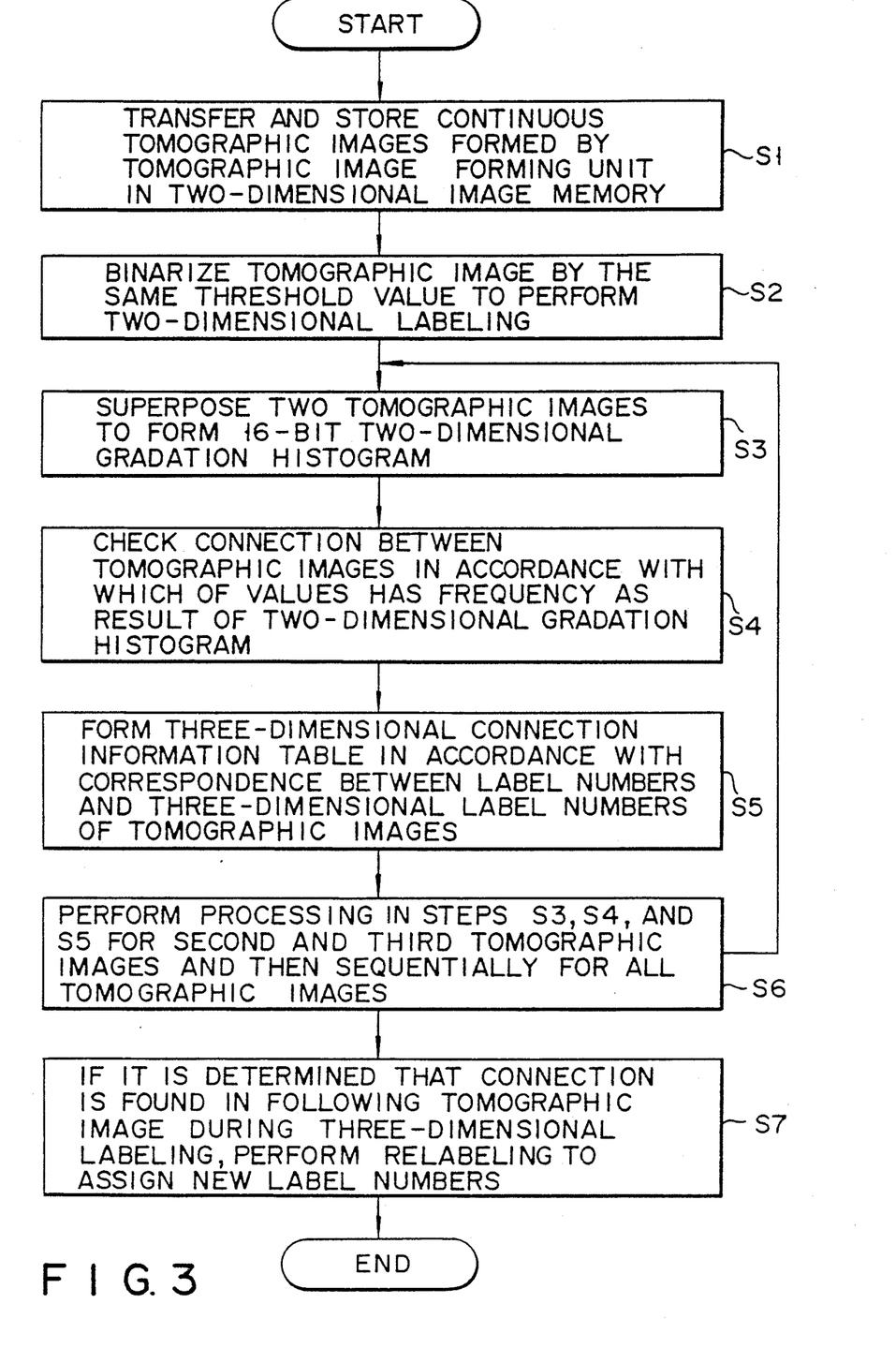
FIG. 3 is a flow chart for explaining an operation of a control computer in the above embodiment.

FIGS. 13 to 16 are flow charts for explaining steps S2 to S7 in FIG. 3.

Figure 13:
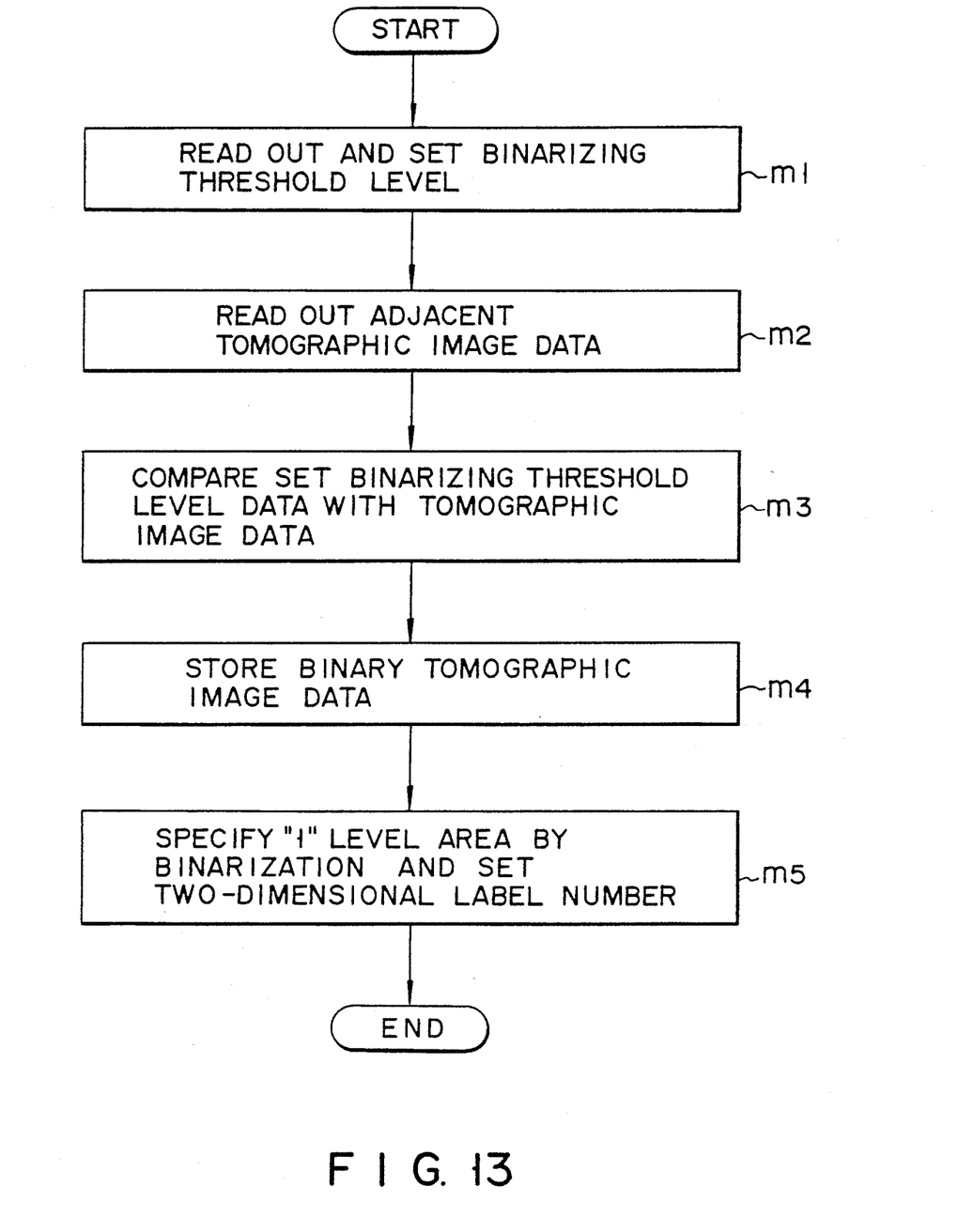
FIGS. 13 to 16 are flow charts for explaining operations of the control computer for performing two-dimensional labeling, two-dimensional histogram formation, three-dimensional connection information table formation, and three-dimensional relabeling in the above embodiment.

FIG. 13 shows in detail the operation of two-dimensional labeling processor 18 of FIG. 1. In FIG. 13, at the first step m1, a binarizing threshold value is read out and set in a memory of processor 18. Then, in step m2, the first tomographic image is read out from image memory 17 and stored in a memory in processor 18. In step m3, the first pixel image data is read out and the level thereof is compared with the set threshold level so as to check whether the pixel data level is larger than the threshold level. When the pixel data level is larger than the threshold level, binary level "1" is given to the first pixel data. Then, the second pixel image data arranged in the direction of lines L1, L2, . . . is read out and compared with the threshold level. When the second pixel level is larger than the threshold level, binary level "1" is given to the second pixel data. The similar operation is repeated for all the 256 pixel images in the first tomographic image and obtained binary image data is stored in a memory in processor 18 in step m4 of FIG. 13. As a result, areas of pixels having a level larger than the threshold level are specified in the memory by binary data "1" as shown in FIG. 4A. Two-dimensional label numbers (1 to 4 in the case of FIG. 4A) are then assigned as has been described before by referring to FIG. 4B, in step m5 in FIG. 13.

When the two-dimensional labeling is completed in processor 18, two-dimensional histogram measuring will be started in processor 19 of FIG. 1. The steps of this histogram measuring will be described in detail here by referring to FIG. 14.

Figure 14:
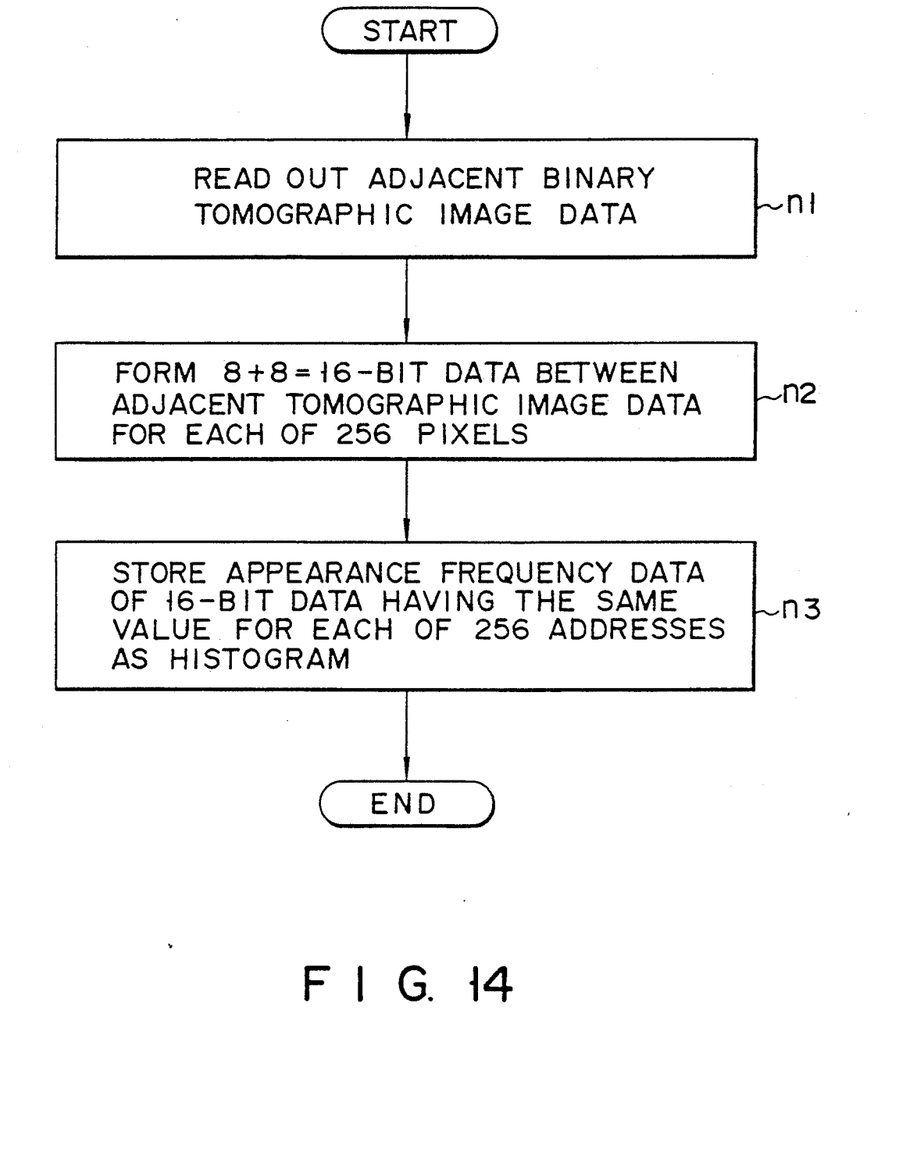

In FIG. 14, the first and second binary tomographic images of stored binary tomographic image data is accessed and read out in step n1. Each of binary pixel data is composed of 8 bits as shown in FIG. 6. Then, in step n2, the first binary pixel data in the first image data and the corresponding first binary pixel data in the second image data is fetched and combined together to form 16-bit binary data which is stored in a memory provided in processor 19. Then the second binary pixel data in the first image data and the corresponding second pixel data in the second image data is fetched and combined to form second 16-bit binary data which is stored in the memory. In a similar manner, all the 265 pixel data in the first and second image data is successively fetched and combined.

Figure 8B:
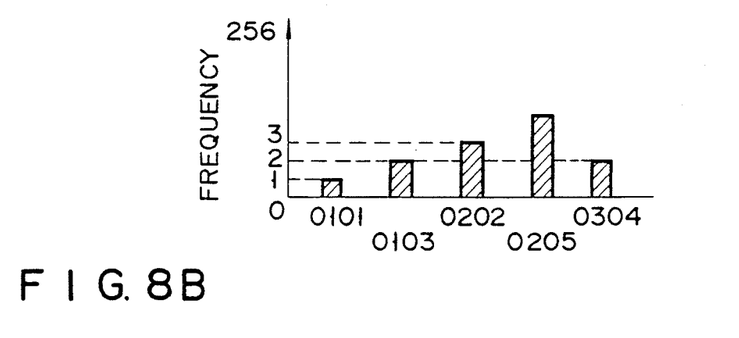

In the next step n3 in FIG. 14, the value of the first 16-bit data is read and the level thereof is detected. When the level thereof is detected as "0101", the data is plotted as frequency "1" as shown in FIG. 8B. If the second-16-bit data has a level of "0103", the data is plotted as frequency "1" in the histogram of FIG. 8B. When the third 16-bit data has again a level of "0103", the data is plotted up to the frequency "2". In the similar manner, a level of each 16-bit data is successively detected and plotted in the histogram of FIG. 8A. The histogram data thus obtained is stored in a memory as histogram data.

Figure 15:
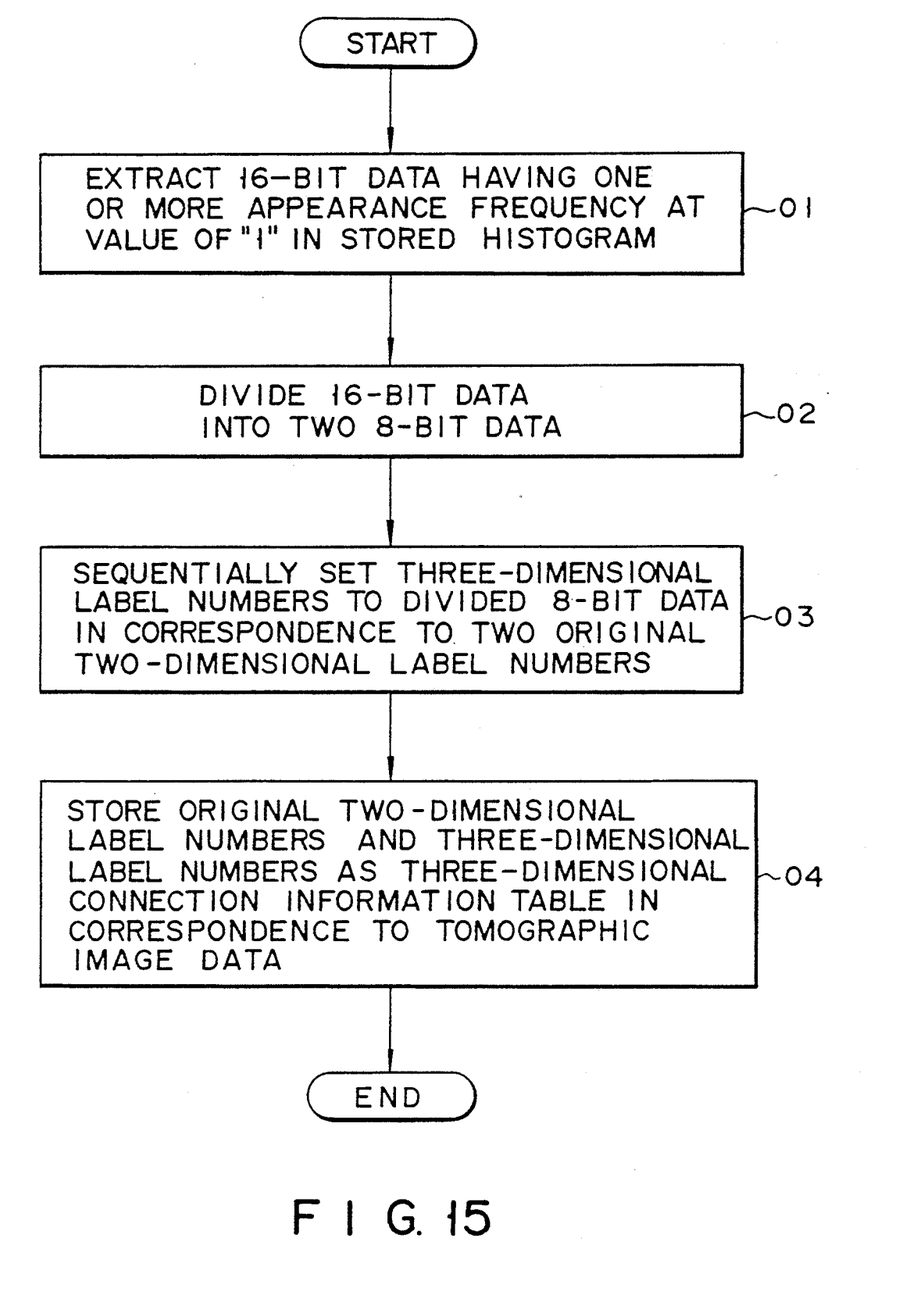

A process of forming the three-dimensional connection information table will be described in detail by referring to FIG. 15, in which the first step 01 is executed. The 16-bit data having one or more appearance frequency at value "1" is extracted from the stored histogram. In the case of the histogram shown in FIG. 8B, the maximum frequency is obtained at the level of "0205". This means that the data having the level "0205" appears most frequently in this particular histogram.

Then, in step 02, each of 16-bit data is again divided into two 8-bit data so as to compose two adjacent binary tomographic image data.

The 8-bit data obtained in step 02 and the correspondence two-dimensional label number is fetched for each of the adjacent binary tomographic image data in step 03. Further, the corresponding two two-dimensional label numbers are compared with each other to see whether they have the same number. When it is detected that the same number is assigned to two adjacent binary pixel image data, the latter two dimensional label number is deemed as a three-dimensional label number. When different two-dimensional label numbers are obtained, the label number of latter image data is changed to that of the former image data as a three-dimensional label number so as to show that these data continues in the vertical direction of the two successive tomographic images.

Then, in step 04, the original two-dmensional label numbers and the obtained three-dimensional label numbers are stored in a table memory as three-dimensional connection information table in correspondence to tomographic image data as in the manner described in Table 1.

Figure 16:
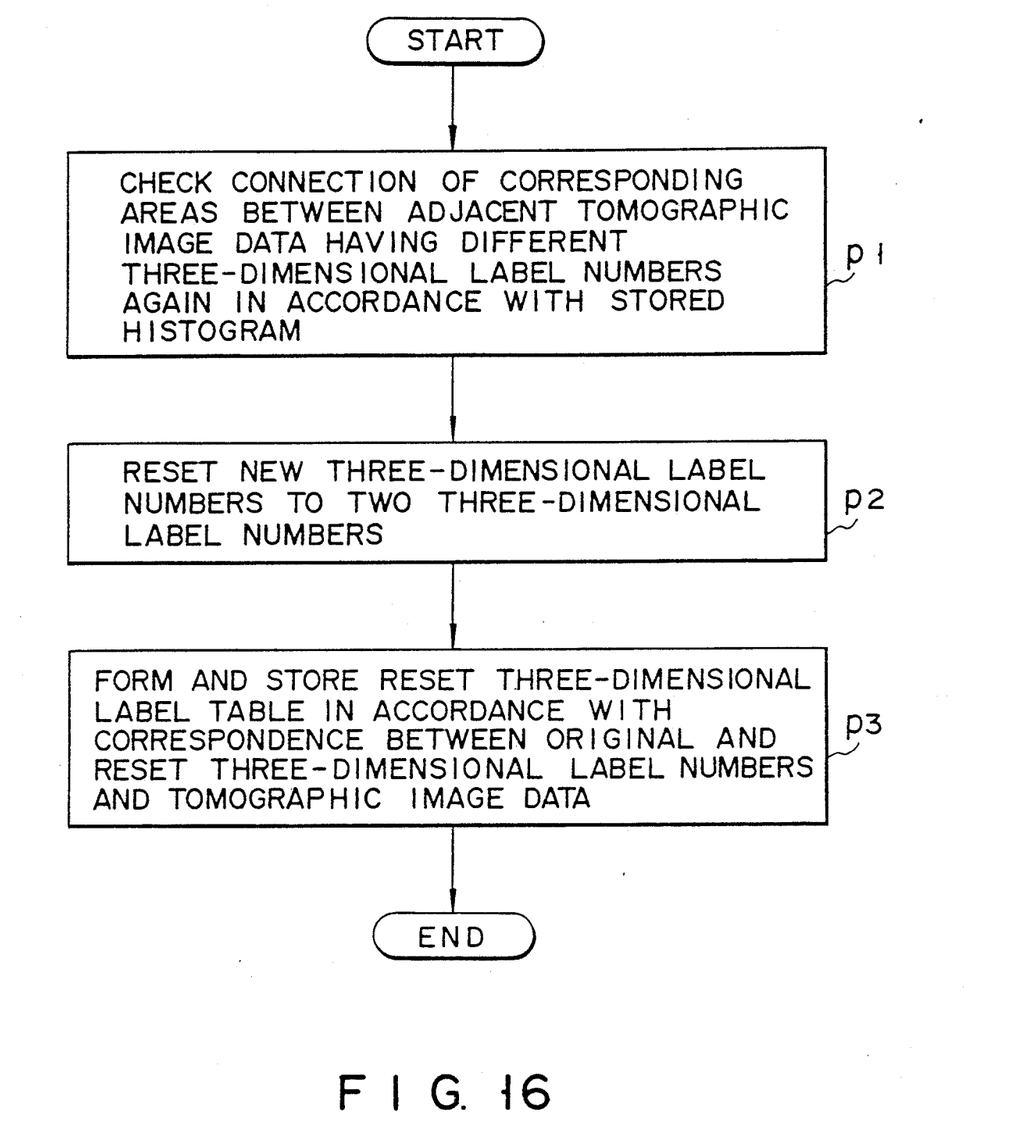

After the three-dimensional connection information table is stored, the connection of corresponding areas between adjacent tomographic image data is checked to see whether they have different three-dimensional label numbers in step p1 in FIG. 16. When it is detected that image data in two or more continuous tomographic images have different label numbers, the corresponding histograms are again read out to check whether the corresponding areas are connected with each other for more than three continuous tomographic images.

When it is detected that two areas having different three-dimensional label numbers are connected with each other, a new three-dimensional label number is assigned and restored in the memory as in the step p2.

Finally, in step p3, the original three-dimensional label number and the new three-dimensional label number are correspondingly stored to form a reset three-dimensional label table as shown in Table 2.

As described above, according to the embodiment of the present invention, tomographic images can be binarized without comparing adjacent pixels of the tomographic images, and processing is performed by assigning numbers to areas using obtained binary images. Therefore, the processing can be performed at high speed. In addition, three-dimensional labeling can be performed using the two-dimensional processing means such as two-dimensional image memory 17 and two-dimensional labeling processor 18. This also increases the processing speed. Furthermore, since the two-dimensional processing means is used, the entire system can be made compact and at low cost.

Figure 12A:
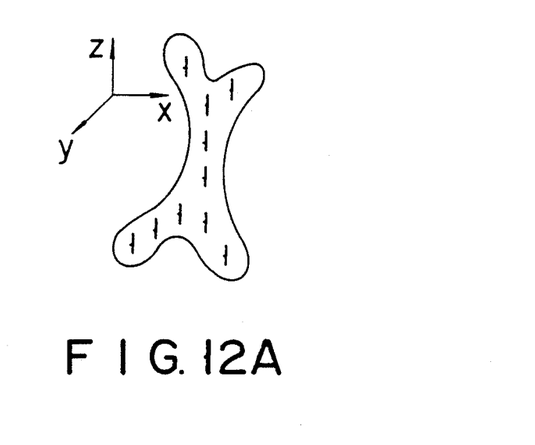
FIGS. 12A and 12B are views showing three-dimensional labeling obtained in accordance with the embodiment and that obtained in accordance with a modification, respectively.
Figure 12B:
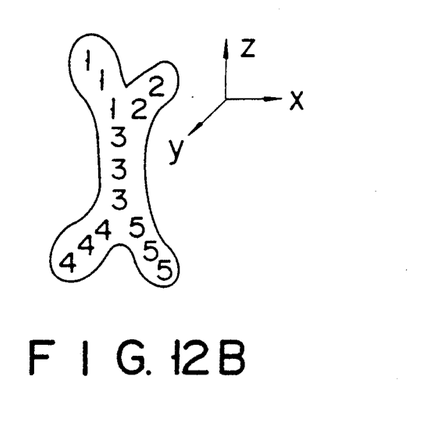

Note that in the above embodiment, the tomographic images formed by tomographic image forming unit 16 are directly transferred to and stored in two-dimensional image memory 17. However, if the tomographic images are temporarily stored in magnetic disk unit 13 and then transferred to memory 17, the same operation can be performed with memory 17 of a smaller capacity. In the above embodiment, three-dimensional connection is obtained by labeling of four adjacent points. However, if labeling of four adjacent points is performed after binarization and expansion by a three-dimensional logic filter, labeling of 18 adjacent points or 26 adjacent points can be similarly performed. In order to represent connection between the tomographic images, the same three-dimensional label number is given to the areas which are three-dimensionally connected with each other as shown in FIG. 12A. However, if methods of forming the three-dimensional connection information table and the relabeling table are changed, three-dimensional labeling can be performed in units of three-dimensional connected branches as shown in FIG. 12B. That is, the present invention can be variously modified without departing from the spirit and scope of the present invention.

As has been described in detail, according to the present invention, there is provided a three-dimensional labeling apparatus which can perform three-dimensional labeling processing at high speed using the two-dimensional processing means, can divide binary three-dimensional continuous tomographic images into continuous areas, can easily obtain three-dimensional characteristic parameters such as a volume, a surface area, and a major axis direction of each area, and can extract a characteristic classification, a defect, and a foreign matter area of the area in accordance with the obtained parameters.

What is claimed is:

1. A three-dimensional labeling apparatus for two-dimensional sliced image information, comprising:

means for storing a plurality of two-dimensional sliced image information of a three-dimensional object, said two-dimensional sliced image information being composed of a plurality of image pixels;

means for binarizing each of said plurality of two-dimensional sliced image information by using a same predetermined threshold level to form a plurality of binarized image regions in each of said two-dimensional sliced image information;

means for two-dimensionally labeling said plurality of binarized image regions in each of said two-dimensional sliced image information to obtain two-dimensionally labeled sliced image information;

two-dimensional histogram forming means for forming a two-dimensional histogram representing a three-dimensional connection information of adjacent two of said two-dimensional sliced image information;

means for determining a connection relationship between two binarized image regions having labels applied by said two-dimensionally labelling means and included in the adjacent two of said two-dimensional sliced image information by referring to the two-dimensional histogram formed in said two-dimensional histogram forming means;

means for three dimensionally labeling each of said two-dimensionally labeled binarized image regions in each of said adjacent two sliced image information in accordance with a determination result of said determining means to form a first three-dimensional connection information table; and means for determining a connection relationship between a first three-dimensionally labeled image region in a first two-dimensional sliced image information and a second three-dimensionally labeled image region in a second two-dimensional sliced image information which is not adjacent to said first two-dimensional sliced information to form a re-labeled three-dimensional connection information table.

2. The apparatus according to claim 1, wherein said two-dimensional labeling means include a two-dimensional labeling processor for executing two-dimensional labeling.

3. The apparatus according to claim 1, wherein said two-dimensional histogram forming means include;

means for reading out a predetermined adjacent binary sliced image data composed of pixel data of a given bit structure;

means for forming an added bit data by adding a bit data of a former binary image data and a corresponding bit data of a latter binary image data of said two-dimensional adjacent sliced image information for all pixel data in each of the sliced image information; and means for detecting a number of times at which data of the added bit data having the same value for each of addresses of said two-dimensional image memory means appears so as to form a histogram.

4. The apparatus to claim 3, wherein said two-dimensional histogram forming means include a two-dimensional histogram measuring processor for executing histogram forming.

5. The apparatus according to claim 3, wherein said three-dimensional connection information table forming means include;

means for extracting an added bit data having at least a value of "1" in said obtain histogram;

means for dividing the added bit data into two original bit data;

means for sequentially setting three-dimensional label numbers to divided original bit data in correspondence to original two-dimensional label numbers; and means to storing original two-dimensional label numbers and three-dimensional label numbers as three-dimensional connection information table in correspondence to sliced image data.

6. The apparatus according to claim 5, wherein said three-dimensional connection information table forming means further include;

means for checking connection of corresponding areas between adjacent sliced image data having different three-dimensional label numbers again in accordance with the obtained histogram;

means for resetting new three-dimensional label numbers to two-dimensional label numbers; and means for forming reset three-dimensional label table in accordance with correspondence between original and reset three-dimensional label numbers and sliced image data.

* * * * *